Patented Sept. 14, 1954

2,688,774

UNITED STATES PATENT OFFICE 2,688,774

PROCESS FOR MOLDING POLYSTYRENES

Theodore P. Malinowski and Charles G. Trudeau, Springfield, Mass., assignors to Monsanto Chemical Company, St. Louis, Mo., a corporation of Delaware No Drawing. Application April 25, 1951, Serial No. 222,926

10 Claims. (Cl. 18—55)

This invention relates to glass-filled polystyrene molded objects having superior impact strength at normal temperatures and at low temperatures. More particularly, the invention relates to processes for incorporating glass fibers into polystyrene and to methods of preparing molded objects therefrom.

Polystyrene resins are noted for their clarity, brilliance and electrical resistance properties. They have been used in many applications where these properties render them outstanding in the field of synthetic resins. However, the polystyrene resins have a major drawback in that they are normally quite brittle and shatter easily under impact.

One method for improving the resistance to shock of the polystyrene resins is to incorporate a fibrous glass filler therein. The glass fibers improve the toughness of the polystyrene but present new problems for the manufacture of the moldable compositions and for the molders.

One object of this invention is to provide molded objects of glass-filled polystyrene having improved toughness and resistance to impact.

A further object is to provide a process for preparing molded objects from glass fiber-filled polystyrene which produces molded objects of superior impact strength at normal and low temperatures.

These and other objects are attained by incorporating glass fibers in polystyrene in the substantial absence of mechanical working, subjecting the glass fiber-filled polystyrene to pressure at elevated temperatures in the substantial absence of mechanical working and finally injection molding the compressed filled resin.

The following examples are given in illustration and are not intended as limitations of the scope of this invention. Where parts are mentioned, they are parts by weight.

EXAMPLE I

A glass fiber-filled polystyrene molding composition was prepared by dipping a glass fiber mat in a 35% solids aqueous emulsion of polystyrene until there was obtained a resin pickup in the mat of about 400% by weight based on the weight of the glass. The mat was dried and then heated at 125° C. until the polystyrene fused. The mat was then cut into squares about 1" x 1" x 0.06". One portion of the squares was compression molded to obtain 1" cubes. The compression molding step was carried out at 125° C. and 4000 p. s. i. pressure. The cubes were then injection molded at about 185° C. and about 10,000 p. s. i. pressure on the ram of the injection molding machine. For test purposes, a die was used which produced bars 0.5" x 0.125" x 2.5". The bars thus produced were resistant to shock at room temperature and at temperatures as low as —54° C.

A portion of the cut squares of Example I were injection molded without the compression step. The squares were molded into the same size bars under identical conditions of temperature and pressure to provide a comparison between bars made with and without the compression step. Bars of each of the materials were tested for impact strength and deflection at 23° C. and 50% relative humidity according to A. S. T. M. Test D—256—47T. At the same time similar bars similarly prepared from polystyrene containing no filler were also tested. The results obtained are set forth in the table.

Table

| Material | Flexural Strength, p. s. i. | Deflection, inches | Notched Edgewise Impact, ft. lbs./in. | Unnotched Flat Impact, ft. lbs./in. |
|---|---|---|---|---|
| Preformed Cubes | 20,300 | 0.142 | 4.2 | 1.6–1.9 |
| Untreated Squares | 19,800 | 0.114 | 2.3 | 1.0–1.4 |
| Polystyrene Unfilled | 15,750 | 0.226 | 1.1 | 0.7–1.3 |

It can be seen from the table that the glass fiber filler increases the flexural strength of polystyrene by about 30% with or without the preforming step, and that the impact, both edgewise and flat, is greater for the preformed material than for the material injection molded directly from the fusing step. A particularly unexpected result was the increase in deflection obtained by the preform step, since it is generally considered that an increase in flexural strength is accompanied by a decrease in the deflection.

The bars prepared from the preformed cubes were still tough and impact resistant at —54° C. whereas unfilled polystyrene was brittle and the bars prepared from the filled polystyrene without preforming were intermediate in strength.

EXAMPLE II

A glass-filled polystyrene is prepared by dipping glass roving in a 30% solids polystyrene aqueous emulsion until there is obtained a resin pickup of about 230% by weight based on the weight of the glass. The roving is dried and then heated at 125° C. to fuse the resin. The heated roving is then passed through a pair of squeeze rolls heated to about 150° C. and adjusted to apply a pressure of about 4000 p. s. i. on the roving. No mechanical working of the filled resin occurs in this step other than the compression of the roving at the elevated temperature. The compressed roving is then cut into pieces about one inch long and the pieces are fed to an injection molding machine operating at 250° C. with about 10,000 p. s. i. pressure on the ram. The molded objects are resistant to impact at both room temperature and −54° C. Objects molded under the same conditions from portions of the resin impregnated glass roving which are not subjected to the compression step are less resistant to impact both at normal temperature and at −54° C.

Similar results may be obtained by adding glass fibers to an aqueous emulsion of polystyrene or to a solution of polystyrene in organic solvents. After a short period of mild agitation to insure thorough wetting of the glass fibers, the liquid phase of the mixture is removed by drying and the polystyrene is fused around the glass fibers. The fused filled resin is then preformed as described above and finally injection molded. An aqueous medium is generally preferred since it is frequently difficult to remove all of the organic solvent from the polystyrene.

It is also possible to add the glass fibers to styrene monomer and then polymerize the monomer. The polymerization may be carried out by the standard mass or emulsion methods with one restriction, i. e., sufficient agitation of the polymerizing materials must be maintained to keep the glass fibers evenly dispersed throughout the styrene but without substantial disintegration of the fibers. In the mass polymerization process, the agitation may be discontinued when the viscosity of the partly polymerized styrene is heavy enough to maintain the fibers in suspension with a minimum of settling. In emulsion or suspension polymerization, agitation should be maintained throughout the polymerization reaction.

If a mass polymerization process is used, the product is generally a massive shape of filled polystyrene which must be disintegrated before the material can be further processed. The disintegration step produces a shredded material having a high bulk factor. This shred must then be subjected to the compression step before the injection molding step. If emulsion or suspension polymerization methods are used, the final product may be dried and then used directly in the compression step.

When a dipping process such as shown in the examples is used, it is necessary to remove the water or solvent and then to fuse the resin on the glass fibers prior to the compression step. The fusion step is carried out by simply heating the polystyrene and glass at 110° C. to 180° C. in the absence of pressure.

Regardless of the process used to incorporate the glass fibers into the polystyrene, it is necessary to avoid mechanical working of the filled polystyrene. Thus, the filled polystyrene should not be malaxated on milling rolls, in worm-type extruders or mixers such as Banbury or dough-type mixers. The fibers cannot be incorporated into polystyrene by adding the fiber to a molten resin in malaxation apparatus and still obtain the improved products of this invention.

After the polystyrene has been modified with the glass fibers, a compression step is necessary before the composition is ready for the injection molding process. This step must also be carried out in the substantial absence of mechanical working. In other words, the filled polystyrene should be compressed at temperatures of at least 125° C. and pressures of at least 1000 p. s. i. without materially deforming the composition, i. e., flow of the filled resin during the compression step should be held to a minimum.

The compression step may be carried out by inserting the filled polystyrene between heated platens, or in a heated mold to which pressure can be applied without substantially distorting or flowing the resin. If glass mats or rovings are used they are conveniently compressed by passing them between a pair of heated squeeze rolls adjusted to apply pressure to the mat or roving without building up a mass of material in the nip of the rolls. At temperatures of 150° C. to 180° C. and pressures of 5000 to 10,000 p. s. i., the compression step may be completed in a matter of seconds.

The glass fibers used as fillers should be from 0.25 to about 2 inches in length. They may be in the form of free fibers or in the form of a mat or roving. The fibers are surprisingly tough and flexible and are not easily broken by impact or flexion.

The polystyrene should have a molecular weight of from 40,000 to 150,000, as determined by the Staudinger equation, in order to obtain molded objects of superior impact strength. The emulsions or organic solvent solutions of the polystyrene used to load glass mats or rovings should contain from 30 to 50% styrene resin solids by weight.

To obtain moldable compositions of high impact strength coupled with moldability, 100 parts of glass fibers should be incorporated into from 230 to 450 parts of polystyrene. The compositions may be further modified with plasticizers, pigments, dyes, stabilizers, lubricants, etc. as desired.

The injection molding step may be carried out in standard injection molding apparatus at temperatures of from 145° C. to 350° C. and pressures of from 8000 to 40,000 p. s. i.

Variations may be made in the products and processes of this invention without departing from the spirit and scope thereof as defined by the appended claims.

What is claimed is:

1. A process for producing molded objects of glass-filled polystyrene having improved impact strength which comprises incorporating 100 parts of glass fibers into 230 to 450 parts of polystyrene in the substantial absence of mechanical working, compressing the filled polystyrene at a pressure of at least 1000 p. s. i. at a temperature of at least 125° C. in the substantial absence of mechanical working and thereafter injection molding the compressed polystyrene at a temperature of from 145° C. to 350° C. and a pressure of from 8000 to 40,000 p. s. i.

2. A process as in claim 1 wherein the glass fibers are incorporated into the polystyrene by adding the glass fibers to the monomer followed by polymerization of the monomer.

3. A process as in claim 2 wherein the mass polymerization system is used.

4. A process as in claim 2 wherein an aqueous emulsion polymerization system is used.

5. A process as in claim 1 wherein the glass fibers are in the form of a glass mat.

6. A process as in claim 5 wherein the glass fiber mat is dipped into an aqueous emulsion of polystyrene to load the glass fiber mat with polystyrene, and the polystyrene is fused on the glass fibers at from 110° C. to 180° C. prior to the compression step.

7. A process as in claim 5 wherein the glass fiber mat is dipped in an organic solvent solution of polystyrene to load the mat with polystyrene, and the polystyrene is fused on the glass fibers at from 110° C. to 180° C. prior to the compression step.

8. A process as in claim 1 wherein the fibers are in the form of glass rovings.

9. A process as in claim 8 wherein the glass rovings are dipped into an aqueous emulsion of polystyrene to load the rovings with the polystyrene and the polystyrene is fused on the glass fibers at 110° C. to 180° C. prior to the compression step.

10. A process as in claim 8 wherein the rovings are dipped in an organic solvent solution of polystyrene to load the rovings with the polystyrene, and the polystyrene is fused on the glass fibers at 110° C. to 180° C. prior to the compression step.

References Cited in the file of this patent

UNITED STATES PATENTS

| Number | Name | Date |
|---|---|---|
| 1,836,021 | Gibbons | Dec. 15, 1931 |
| 2,287,277 | Ryder | June 23, 1942 |
| 2,345,305 | Thornton | Mar. 28, 1944 |